United States Patent [19]

Siiberg

[11] 4,103,265
[45] Jul. 25, 1978

[54] FLUID BILEVEL SENSOR

[75] Inventor: Hemming G. Siiberg, Summit, N.J.

[73] Assignee: Wagner Electric Corporation, Parsippany, N.J.

[21] Appl. No.: 722,023

[22] Filed: Sep. 10, 1976

[51] Int. Cl.² .............................................. H01H 9/00
[52] U.S. Cl. .................................... 335/205; 200/84 C
[58] Field of Search ........... 335/205; 200/84 R, 84 C; 337/105

[56] References Cited

U.S. PATENT DOCUMENTS

| | | | |
|---|---|---|---|
| 2,976,378 | 3/1961 | Goddard | 200/84 C |
| 3,437,771 | 4/1969 | Nusbaum | 200/84 C |
| 3,798,401 | 3/1974 | Kochanski et al. | 200/84 C |

*Primary Examiner*—George Harris
*Attorney, Agent, or Firm*—Eyre, Mann, Lucas & Just

[57] ABSTRACT

A fluid bilevel sensor containing a differential float and a magnetically actuatable switch generating an electrical signal upon the occurrence of one fluid level. A thermal time delay delays the application of the electrical signal to a load for a predetermined time. The magnetically actuatable switch removes the electrical signal upon the occurrence of a second fluid level. The thermal time delay delays the removal of the electrical signal from the load for a predetermined time.

6 Claims, 7 Drawing Figures

FLUID BILEVEL SENSOR

BACKGROUND OF THE INVENTION

Fluid bilevel sensors have been long used in such applications as control devices for sump pumps, mine drainage pumps, bilge pumps, and toilet tanks. They sense when a first level of fluid is attained, then provide a control signal which frequently is used to control a valve or pump which tends to change the fluid level in the desired direction. When they sense that a second level of fluid is attained, they provide a second control signal which usually alters the condition of valve or pump. For example, in the case of the pump control devices mentioned above, when a first fluid level is attained, the bilevel sensors provide an electrical output signal which energizes the pump to begin pumping fluid into or out of the measured fluid. When the fluid level is changed to the second level, the fluid bilevel sensor removes the electrical output signal and deenergizes the pump.

An extensive art has developed in single-level and bilevel fluid sensors. For example, Booth et al in U.S. Pat. No. 2,927,175, Lewis et al in U.S. Pat. No. 3,560,918, Hocking et al in U.S. Pat. No. 3,691,522, and Putt in U.S. Pat. No. 3,678,490 all disclose fluid level sensors for a variety of purposes.

The prior art fails to teach a fluid level sensor, either single level or bilevel, which uses a differential float. The prior art also fails to teach the use of a thermal time delay with a fluid level sensor.

SUMMARY OF THE INVENTION

A fluid bilevel sensor contains a differential float consisting of a float body slideably disposed on a free rod. Rising fluid level slides the float along the rod until restrained by a collar at the upper end of the rod, which also contains a permanent magnet. Further rise in fluid level carries float and rod together until, when the upper fluid level is attained, the magnet in the upper end of the rod comes close enough to a mass of magnetically attractable material, part of, or in the vicinity of a magnetically actuatable switch. The rod is abruptly drawn a short distance out of the float toward the magnetically actuatable switch and remains held there by magnetic attraction. The contacts of the magnetically actuatable switch reverse their conditions at the near approach of the magnet. When the fluid level decreases, the float slides downward on the rod while the rod remains held by magnetic attraction to the magnetically actuatable switch. The magnetically actuatable switch remains actuated by the continued proximity of the magnet. With further decrease in the fluid level, downward travel of the float is momentarily stopped by a collar on the lower end of the rod. A slight additional fluid level decrease imposes more of the weight of the float on the rod. Due to a decrease in buoyancy V of the float, the magnet is abruptly separated from the magnetically attractable material and descends through the float. The switch contacts resume their original condition.

DETAILED DESCRIPTION OF THE PREFERRED EMBODIMENT

Figure 1:
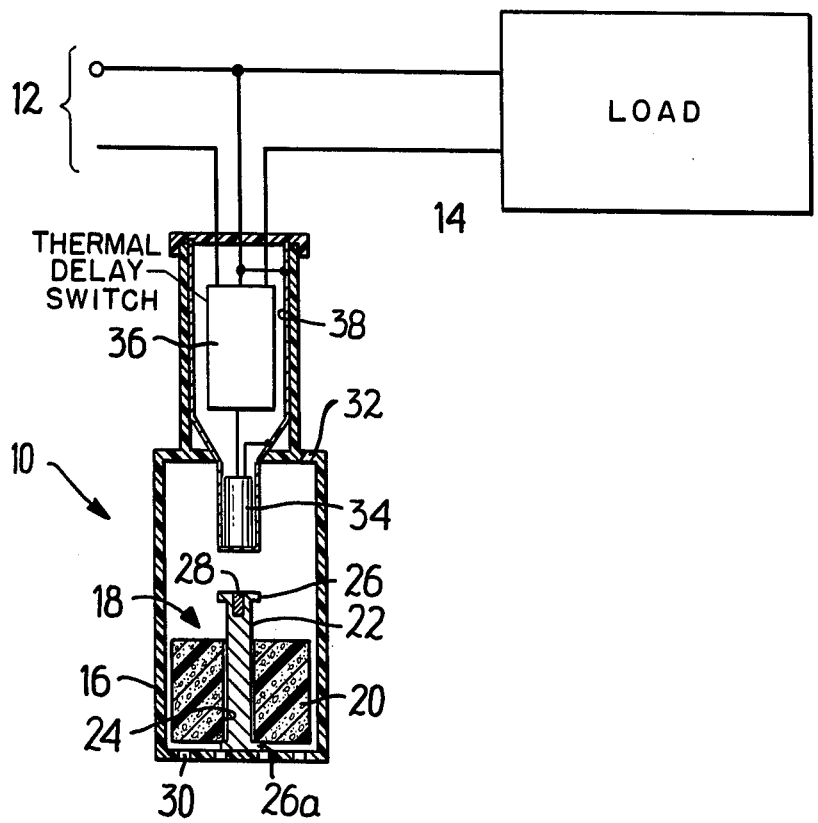
FIG. 1 shows a schematic cross section of the fluid bilevel sensor.

Referring to FIG. 1, the fluid bilevel sensor is shown generally at 10 electrically interposed between a line source of electrical power 12 and a load 14. The load 14 can be any electrically controllable device such as a pump or valve. The fluid bilevel sensor 10 has a lower chamber 16 containing a differential float 18 therein. The differential float 18 is composed of a float body 20 and an axial rod 22 which loosely fits within the axial bore 24 in the float body 20. Collars 26, 26a at the upper and lower ends respectively of the axial rod prevent withdrawal of the axial rod from the axial bore. A permanent magnet 28 is fixed to the upper end of the axial rod.

A plurality of holes 30 in the bottom of the lower chamber 16 allow fluid entry. An air hole 32 in the top of the lower chamber 16 allows the escape or entry of air displaced by fluid entering or leaving the lower chamber 16.

The float body 20 is of lower specific gravity than the fluid whose level is to be controlled. The axial rod 22 is of greater specific gravity than the fluid. The composite differential float 18 has a specific gravity lower than that of the fluid. When fluid enters the lower chamber, the float body 20 is free to rise with the fluid, initially leaving the axial rod 22 resting on the bottom of the lower chamber 16. When the fluid level rises high enough that the top of the float body 20 touches the bottom of the upper collar 26 the float body 20 begins to raise the axial rod 22.

A magnetically actuatable switch 34 is disposed in the lower chamber or body 16 coaxial with the axial rod 22. The magnetically actuatable switch 34, of a type well-known in the art such as a reed relay or an axial travel reed switch, reverses the condition of its contacts when it is exposed to a predetermined level of magnetic flux. A thermal delay switch 36 is electrically connected to the magnetically actuatable switch 34 and to the line 12 and load 14 and doubles as a powerseitch. The magnetically actuatable switch 34 and the thermal delay switch 36 are conveniently enclosed within a fluid tight container 38 which prevents the entry of fluid especially from the interior of the lower chamber 16.

Figure 2:
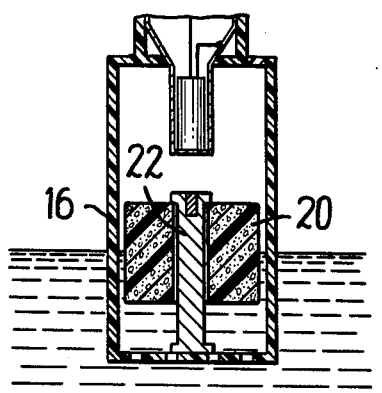
FIGS. 2-5 show partial cross sections illustrating the motion of the differential float during changes in fluid level.
Figure 3:
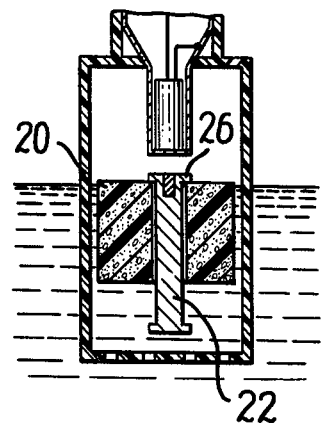
Figure 4:
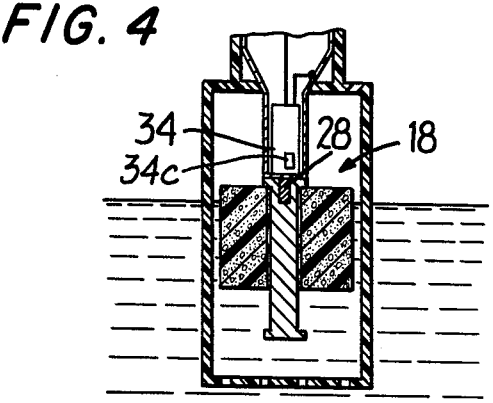
Figure 5:
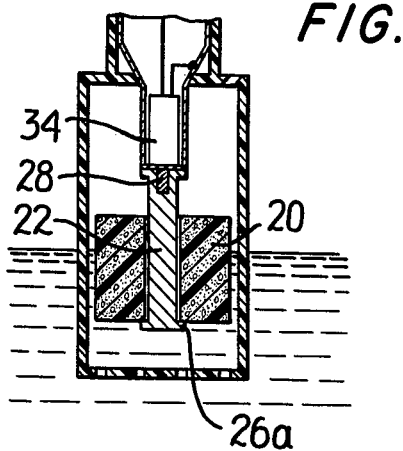
Figure 6:
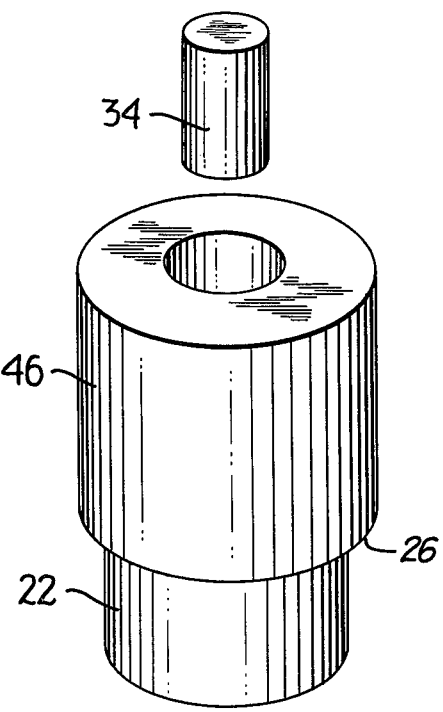
FIG. 6 shows a fractional view of an embodiment using a ring magnet.
Figure 7:
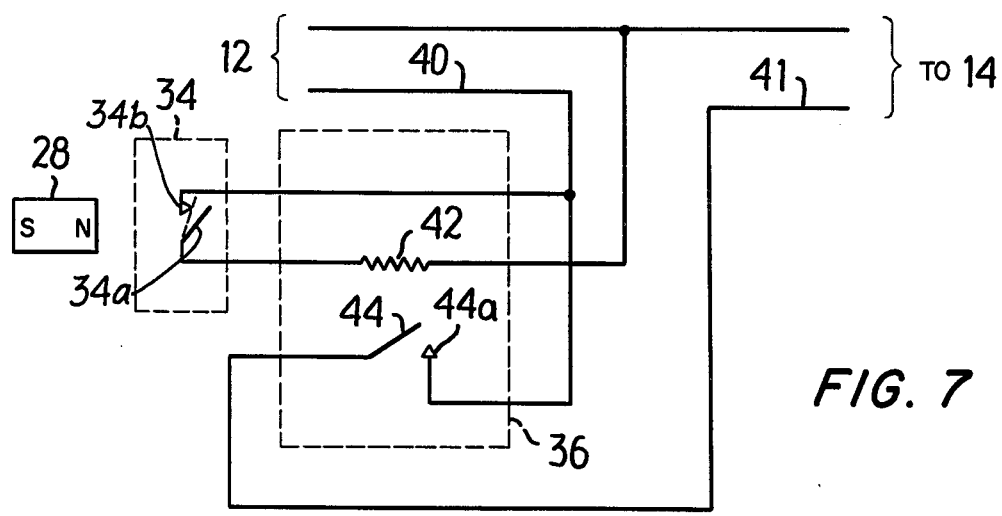
FIG. 7 shows an electric schematic of one embodiment of the invention.

FIGS. 1-5 illustrate a normal fluid actuation sequence of the fluid bilevel sensor as applied to prevent overflow in a tank. In FIG. 1 there is no fluid in the lower chamber 16, both the float body 20 and axial rod 22 rest at their lower levels. In FIG. 2 an intermediate fluid level has raised the float body 20 from the bottom of lower chamber 16 but the axial rod 22, being of higher specific gravity than the fluid, remains resting on the bottom of the lower chamber 16. In FIG. 3 a still higher level of fluid has raised the float body 20 until it begins to elevate the axial rod 22 on the collar 26. In FIG. 4, the fluid level has raised the differential float 18 high enough that the permanent magnet 28 has become attracted and held to a mass of magnetically attractable material, 34C in the vicinity of the magnetically actuatable switch 34. At that point, proximity of the permanent magnet 28 to the magnetically actuatable switch 34 reverses the condition of its electrical contacts. FIG. 5 shows the condition after the fluid level has decreased from the condition shown in FIG. 4. The float body 20 has descended with the fluid level whereas the axial rod 22 has remained in the upper position being held there by attraction of the permanent magnet 28. A further decrease in fluid level imposes an increasing proportion of the weight of the float body 20 on the lower collar 26a. A point is soon reached at which the magnetic attraction supporting the axial rod 22 is insufficient to overcome the weight of the float body 20 tending to lower it. The axial rod 22 thereupon separates from the magnetically actuatable switch 34 and drops through the axial bore 24 into a position similar to that shown in FIG. 2. In this transistion the electrical contacts in the magnetically actuatable switch 34 resume their initial condition. FIG. 6 shows a configuration of the upper end of the axial rod in which a toroidal permanent magnet 46 is elevated to encircle the magnetically actuatable switch 34. This arrangement is most satisfactory with magnetically actuatable switches of the laterally actuatable reed relay type. Alternatively, the permanent magnet 28 may be imbedded in the end of the axial rod 22 and operate an axial travel reed switch. FIG. 7 shows a schematic diagram of one embodiment of the invention wherein like numerals refer to the same parts. The magnetically actuatable switch 34 is connected in series with the switched line input 40 of the power input 12. When the permanent magnet 28 is brought within a predetermined distance of the magnetically actuatable switch 34, the contacts 34a, 34b of the magnetically actuatable switch 34 are closed as shown in dashed line. Power is thereby connected across the heater 42 of a thermal delay switch. At the end of a predetermined time delay, the contacts 44, 44a of the thermal delay switch reverse their initial condition. In the embodiment shown in the figure the contacts are normally open and become closed at the end of the predetermined time delay. It would be obvious to one skilled in the art that the contacts 44, 44a may be normally closed and opened after the predetermined time delay. In addition, the contacts 44, 44a may also include a third contact, not shown, such that both normally open and normally closed functions are accomplished by the same switch at the end of the predetermined time delay. When the contacts 44, 44a become closed, power is connected from switched input line 40 to switched output line 41 and thence to the load 14.

It will be understood that the claims are intended to cover all changes and modifications of the preferred embodiments of the invention, herein chosen for the purpose of illustration which do not constitute departures from the spirit and scope of the invention. For example, an embodiment of the bilevel fluid sensor which omits the thermal time delay should be considered to be encompassed within the inventive concept.

What is claimed is:

1. A fluid level sensor comprising:
   (a) a chamber;
   (b) a magnetically actuatable switch having at least one pair of contacts in said chamber;
   (c) differential float means guidingly contained within said chamber;
   (d) said differential float means having a float body containing an axial bore;
   (e) said float body having a specific gravity lower than said fluid;
   (f) said float body being adapted to floatable displacement upon said fluid within said chamber;
   (g) a rod slideable in said axial bore and passing completely therethrough;
   (h) a collar at each end of said rod, said collars being larger than said axial bore for preventing the withdrawal of said rod from said axial bore;
   (i) a magnet affixed to the upper end of said rod;
   (j) said rod and magnet having a combined specific gravity greater than said fluid;
   (k) said differential float, including said float body, rod and magnet, having a combined specific gravity lower than said fluid;
   (l) said differential float means being operative to move said magnet within actuating distance of said magnetically actuatable switch upon the recurrence of a first predetermined fluid level;
   (m) a mass of magnetically attractable material near said magnetically actuatable switch;
   (n) the attraction of said magnetically actuatable material for said magnet being sufficient to support said rod but insufficient to support both said rod and said float body; and
   (o) said rod and float body being operative to detach said magnet from said magnetically attractable material upon the occurrence of a second predetermined fluid level lower than said first predetermined fluid level.

2. The fluid level sensor recited in claim 1 wherein:
   (a) said permanent magnet is a toroid; and
   (b) said means for moving being effective to move said toroid into encircling relationship with said magnetically actuatable switch.

3. A fluid level sensor comprising:
   (a) a body;
   (b) a magnetically actuatable switch having at least one pair of contacts in said body;
   (c) a permanent magnet;
   (d) float means for moving said permanent magnet within actuating distance of said magnetically actuatable switch in response to the subjection thereof to a first predetermined level of fluid;
   (e) magnetic means for retaining said permanent magnet within said actuating distance;
   (f) means for terminating the retention of said permanent magnet within said actuating distance upon the subjection of said float means to a second predetermined level of fluid;
   (g) a thremal delay switch containing a heater and at least one pair of electrical contacts;
   (h) means for reversing the condition of said electrical contacts upon the heating and cooling of said heater;
   (i) said at least one pair of contacts in said magnetically actuatable switch controlling the application of electrical power to said heater; and
   (j) said electrical contacts in said thermal delay switch controlling the application of electrical power to a switched output line.

4. A fluid level sensor comprising:
   (a) a body;
   (b) a magnetically actuatable switch having at least one pair of contacts in said body;
   (c) a permanent magnet;
   (d) float means for moving said permanent magnet within actuating distance of said magnetically actuatable switch in response to the subjection thereof to a first predetermined level of fluid;
   (e) magnetic means for retaining said permanent magnet within said actuating distance;

(f) means for terminating the retention of said permanent magnet within said actuating distance upon the subjection of said float means to a second predetermined level of fluid;

(g) a thermal delay switch receiving heater power in a first actuation condition of said magnetically actuatable switch and cut off from heater power in a second condition;

(h) at least one pair of electrical contacts in said thermal delay switch which are closed after a first condition of heater power to said thermal delay switch and are opened after a second condition of heater power.

5. A fluid level sensor comprising:

(a) a body;

(b) a float in said body;

(c) a permanent magnet in said float;

(d) a magnetically actuatable switch in said body;

(e) said float being constrained to move within said body upon the admission of fluid therein;

(f) said magnetically actuatable switch being located within said body in a position which allows said permanent magnet to attain actuating distance therefrom upon the occurrence of a predetermined level of fluid;

(g) at least one pair of electrical contacts having first and second positions in said magnetically actuatable switch;

(h) a thermal delay switch;

(i) an electric heater in said thermal delay switch;

(j) said electric heater being connected across a power line in said first position of said magnetically actuatable switch and disconnected therefrom in said second position;

(k) at least one pair of electrical load contacts having first and second positions in said thermal delay switch; and (l) said load contacts being closed after the occurrence of one condition of heater power and opened after the occurrence of another condition of heater power.

6. A fluid level sensor comprising:

(a) a body;

(b) a magnetically actuatable switch having at least a first pair of electrical contacts in said body;

(c) a differential float having a float body and a rod slideably disposed in said float body;

(d) a permanent magnet affixed to one end of said rod;

(e) said differential float being guidably retained in said body such that said permanent magnet is brought within actuating distance of said magnetically actuatable switch upon the subjection of said fluid level sensor to a predetermined fluid level;

(f) a mass of magnetically attractable material in the vicinity of said magnetically actuatable switch, said mass having sufficient permeability to develop an attractive force with said permanent magnet at least equal to the combined apparent weight of said rod and permanent magnet;

(g) said attractive force being less than the combined weight of said float body, rod and permanent magnet;

(h) a thermal delay switch having at least a second pair of electrical contacts and a heater;

(i) means for reversing the condition of said second pair of electrical contacts upon the heating and cooling of said heater;

(j) a switched input line;

(k) a switched output line;

(l) electrical connection between said switched input line and said switched output line being controlled by said second pair of electrical contacts; and (m) electrical input to said heater being controlled by said first pair of electrical contacts.

* * * * *